(12) United States Patent
Holmes et al.

(10) Patent No.: US 6,451,152 B1
(45) Date of Patent: Sep. 17, 2002

(54) METHOD FOR HEATING AND CONTROLLING TEMPERATURE OF COMPOSITE MATERIAL DURING AUTOMATED PLACEMENT

(75) Inventors: Scott Holmes, St. Peters; Stanley A. Lawton, St. Louis; John M. Haake, St. Charles, all of MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/578,069

(22) Filed: May 24, 2000

(51) Int. Cl.⁷ .......................... B32B 31/26; B32B 31/00
(52) U.S. Cl. .................... 156/272.8; 156/173; 156/189; 156/308.2
(58) Field of Search .................... 156/272.8, 189, 156/173, 523, 574, 273.3, 308.2; 219/121.6, 121.61, 121.62, 121.63, 121.76, 121.78

(56) References Cited

U.S. PATENT DOCUMENTS

| | | | |
|---|---|---|---|
| 4,452,533 A | | 6/1984 | Miles et al. |
| 4,540,392 A | | 9/1985 | Junod et al. |
| 4,912,297 A | | 3/1990 | Beyer et al. |
| 5,011,709 A | | 4/1991 | Arbogast et al. |
| 5,212,707 A | | 5/1993 | Heidel et al. |
| 5,228,050 A | * | 7/1993 | LaCourse et al. ............. 372/50 |
| 5,279,693 A | | 1/1994 | Robinson et al. |
| 5,580,413 A | * | 12/1996 | Assink et al. ............. 156/361 |
| 5,690,775 A | | 11/1997 | Calvert et al. |
| 5,698,066 A | * | 12/1997 | Johnson et al. ............. 156/441 |
| 5,705,788 A | | 1/1998 | Beyer et al. |
| 5,715,270 A | | 2/1998 | Zediker et al. |
| 5,764,675 A | | 6/1998 | Juhala |
| 5,792,301 A | | 8/1998 | Calvert et al. |
| 5,808,803 A | | 9/1998 | Ullmann et al. |
| 5,886,313 A | | 3/1999 | Krause et al. |
| 6,096,164 A | * | 8/2000 | Benson et al. ............. 156/425 |

* cited by examiner

*Primary Examiner*—Michael W. Ball
*Assistant Examiner*—Todd J. Kilkenny
(74) *Attorney, Agent, or Firm*—Alston & Bird LLP

(57) ABSTRACT

Composite articles are produced by guiding composite tape material through a compaction region where the tape material is pressed onto a substrate, and heating the tape and substrate ahead of the compaction region by irradiating opposing surfaces of the tape and substrate with laser radiation produced by a laser diode array. The laser diode array is divided into independently controllable diode groups, and the diode groups are controlled so as to independently control heating of one area of the tape and substrate relative to another area of the tape and substrate. In one embodiment, the widthwise profile of the light energy is such that a widthwise portion of the tape at an inner radius of a curved path along which the tape is steered at the compaction region is heated to a greater extent than a widthwise portion of the tape at an outer radius of the path. The laser diode array can also be controlled to heat the tape material to a different extent than the substrate to compensate for different rates of heat loss. One or more diode groups of the array can be deactivated when not needed, such as when the tape material is narrower than the full light field generated by the array. Different diode groups of the array can produce light of different wavelengths for achieving different rates of absorption by different areas of the composite materials.

15 Claims, 6 Drawing Sheets

Tape

Basic illumination on flat with no curvature

Substrate

Illumination increased on substrate and reduced on tape as placement angle decreases.

Illumination decreased on substrate and increased on tape as placement angle increases.

METHOD FOR HEATING AND CONTROLLING TEMPERATURE OF COMPOSITE MATERIAL DURING AUTOMATED PLACEMENT

FIELD OF THE INVENTION

The invention relates to the manufacture of composite articles and, more particularly, to methods for heating composite material to the required temperature in order to maintain adhesion between a composite tape and a substrate on which the tape is placed regardless of the complexity of the tape path curvature or the contour of the substrate.

BACKGROUND OF THE INVENTION

Composite structures made from fiber-reinforced polymer matrix (resin) materials are commonly manufactured by progressively building up the structure with a plurality of layers of thin composite tape or tow, hereafter collectively referred to as tape, laid one layer upon another. Typically, the operation begins by laying a tape onto a starting template having a configuration generally corresponding to the desired shape of the article to be produced. A tape placement head guides a continuous tape onto the template by providing relative movement between the template and the head, such that the head moves over the surface of the template. The head usually makes repeated passes over the template in a defined pattern until the template is entirely covered. Multiple layers of tape are built up by continued passes of the head over the surface. A compaction roller is usually used for pressing the tape against the template or prior-laid layers of tape to facilitate adhesion of the tape thereto, and the tape and/or the substrate onto which it is laid are heated just prior to the tape being compacted to soften the resin and promote adhesion of the tape to the substrate.

The most commonly used heating method for heating the tape and/or substrate is to impinge the materials with a heated gas. A drawback of this approach is that the flow of gas cannot be controlled with any great precision. Consequently, the heating of the tape and substrate cannot be accurately controlled, and hence the adhesion of the tape to the substrate cannot be accurately controlled.

SUMMARY OF THE INVENTION

The present invention seeks to improve the accuracy of heating of tape and substrate materials during automated article manufacturing. More particularly, the invention employs one or more laser diode arrays for heating the tape and substrate. The laser diode array generates a field of light energy comprised of a plurality of light beams generated by a plurality of laser diodes arranged in a rectangular or two-dimensional array. The array preferably is formed by a plurality of laser diode bars stacked one atop another, each bar having a plurality of laser diodes arranged side-by-side in a widthwise direction of the bar. Each bar is configured with a lens or plurality of lenses to collimate the light emitted by each diode so as to generate a plurality of parallel light beams lying generally in a plane. The invention enables the intensity distribution of the light energy to be tailored to the particular configuration of the composite article being produced, thereby optimizing the temperature profile on the article.

In one preferred embodiment of the invention, a method for forming a composite article includes the steps of guiding the composite tape onto a surface of a substrate and pressing the tape against the substrate in a compaction region such that the tape conforms to the contour of the surface of the substrate and is adhered thereto; and irradiating an area defined by opposing surfaces of the tape and of the substrate proximate the compaction region with a field of light energy generated by a laser diode array to heat the tape and substrate, and controlling the laser diode array to independently control heating of one portion of the irradiated area relative to another portion of the irradiated area.

The laser diode array in one embodiment of the invention is positioned to direct the field of light energy onto the tape and substrate such that the widthwise direction of each bar is generally parallel to the widthwise direction of the tape. In the widthwise direction of the tape, the intensity profile of the field of light energy can be varied by controlling the current supplied to individual diodes, or to groups of diodes, within each bar independently of the other diodes or groups of diodes in the bar. In a lengthwise direction of the tape, the intensity profile of the field of light energy can be varied by controlling the current supplied to each bar independently of the other bars in the array. The invention thus enables a temperature profile over the region of the tape and substrate to be controlled in any desired manner.

Alternatively, the laser diode array can be oriented such that the widthwise direction of each bar is parallel with the lengthwise direction of the tape. In this case, the profile of the temperature across the width of the tape is controlled by controlling the light intensity of each bar independently of the other bars, and the profile of the temperature in the lengthwise direction of the tape is controlled by controlling each diode, or each group of diodes, in each bar independently of the other diodes or groups of diodes in the bar.

In another embodiment of the invention, the profile of the laser intensity across the width of the tape is varied as a function of the curvature of the path along which the tape is steered during placement. When steering a tape along a curved path at the compaction region, the material of the tape on the inner radius of the steered path must conform to a greater degree than the material on the outer radius of the path. In conventional forced-air heating of tape and substrate, there is constant uniform heating of the tape across its width, and the tape placement head typically must be slowed down in order to allow the tape to conform to the substrate without substantial puckering or wrinkling. In the present invention, the laser diode array can be controlled to produce greater heating of the tape at the inner radius of the steered path so that the material can more readily flow and conform, and lesser heating at the outer radius of the steered path where less flow is required. Additionally, when the tape placement head negotiates surfaces of concave or convex curvature, the angle of the head with respect to the surface can vary and the speed of the head can vary. For optimum heating of the tape and substrate, the heat addition should be responsive to such changes. This responsiveness cannot be achieved using conventional forced-air heating. With the present invention, however, the heating profile can be tailored to the contour of the steered path so that heating of the tape and substrate can be more nearly optimum at all times.

In a still further embodiment of the invention, the laser diode array is made up of a plurality of independently addressable zones that are positioned side-by-side along the widthwise direction of the tape. Where the tape has a width less than the width of the light field produced by the full laser diode array, the array is controlled such that less than all of the zones are powered, thereby producing a light field whose width at the tape generally matches the band width of the tape. Thus, the laser diode array can be sized such that when all zones are powered it produces a light field that is as wide as the widest tape to be placed, yet when narrower tapes are placed, the light field's width can be reduced by powering only some of the zones. By this method, heat is applied only to areas of the substrate for which heating is required. The independently addressable zones can be made up of laser diode bars or groups of adjacent bars where the bars have their widthwise directions oriented parallel with the lengthwise direction of the tape. Alternatively, the zones can be made up of individual diodes or groups of adjacent diodes in each bar where the bars have their widthwise directions oriented parallel with the widthwise direction of the tape.

The invention also allows the heating of tapes simultaneously fed at differing feed rates to be adjusted to compensate for the different feed rates. Thus, a tape fed at a faster rate can be heated to a greater extent than another tape fed at a lower feed rate. This can be accomplished, for example, by irradiating one tape with one portion of the laser diode array and irradiating the other tape with another portion of the array, and independently controlling the two portions of the array to produce differential light intensities.

The invention also provides a method for heating tape and substrate materials enabling a differential amount of heating between the tape and substrate by controlling the intensity of light emitted by the diodes in the array so as to deliver a different amount of heating energy to the tape relative to that delivered to the substrate. The method can compensate for different rates of heat loss between the tape and substrate so that optimum heating of each can be obtained.

As noted, the invention preferably employs an array of laser diodes formed as a stack of laser diode bars. Each laser diode bar has a plurality of zones each capable of emitting a separate laser beam or a group of side-by-side laser beams. The zones of a bar are arranged in a linear or one-dimensional array, and each zone is independently addressable such that a controller connected with the array can independently control one zone relative to the other zones. An array is formed by stacking several bars one atop another, thus forming a two-dimensional array. The width of the field of light energy can be increased by employing two or more stacks located side-by-side. The intensity of light energy produced by the array can be varied along both directions of the array. The apparatus may further include a lens, mirror, fiber optic element, or other system for guiding and/or focusing the field of light energy onto the surface.

An apparatus for practicing the methods of the invention advantageously comprises a tape placement head, a compaction device, a laser diode array oriented to direct a field of light energy onto opposing surfaces of the tape and substrate, and a controller for controlling the laser diode array. The tape placement head is operable to guide at least one composite tape onto the substrate while relative movement is provided between the tape placement head and the substrate. The compaction device engages the tape in a compaction region formed between the compaction device and the substrate and presses the tape against the substrate such that the opposing surfaces thereof are placed in contact with each other. In some cases the tape material may comprise a plurality of individual bands of slit tape, or tows, that are passed through the compaction region in side-by-side or collimated orientation relative to one another.

Preferably, the tape placement head includes a frame and the compaction device comprises a roller rotatably journalled in the frame. The tape placement head guides a tape, or a plurality of collimated tapes, over the roller and the roller presses the tape(s) onto the substrate. Advantageously, the laser diode array is mounted on the frame of the tape placement head. The tape placement head can be held stationary while the substrate is moved, or the substrate can be held stationary while the tape placement head is moved for laying the tape(s) onto the substrate.

The apparatus can also include a temperature sensor for measuring the temperature of the tape material and/or substrate proximate the compaction region where the tape material is pressed onto the substrate. For example, an infrared temperature sensor can be mounted on the frame of the tape placement head for this purpose. More than one temperature sensor can be used for sensing the temperature in more than one region, or a single thermal imaging device capable of monitoring the temperature distribution in the proximity of the compaction region can be used. The temperature(s) measured by the sensor(s) can be used by the controller for regulating current supplied to the laser diodes in the array in order to maintain a desired heat and, therefore, temperature distribution on the tape and substrate.

Another way in which different rates of heating can be applied to different areas of the tape and/or substrate is to configure the laser diode array such that some diode groups produce laser light of a different wavelength from other diode groups. The rate at which composite material absorbs light energy is dependent on, among other factors, the wavelength of the incident light. Thus, a laser diode array can be formed by stacking a plurality of laser diode bars as described above, wherein some of the diode bars produce light of a different wavelength from other bars. Bars producing light of one wavelength can be used for irradiating the tape material, and bars of another wavelength can be used for irradiating the substrate. Alternatively, bars producing light of one wavelength can be used for irradiating one widthwise portion of the tape material and/or substrate, and bars of another wavelength can be used for irradiating another widthwise portion of the tape material and/or substrate. If desired, the array can also be divided into independently powered diode groups as previously described.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
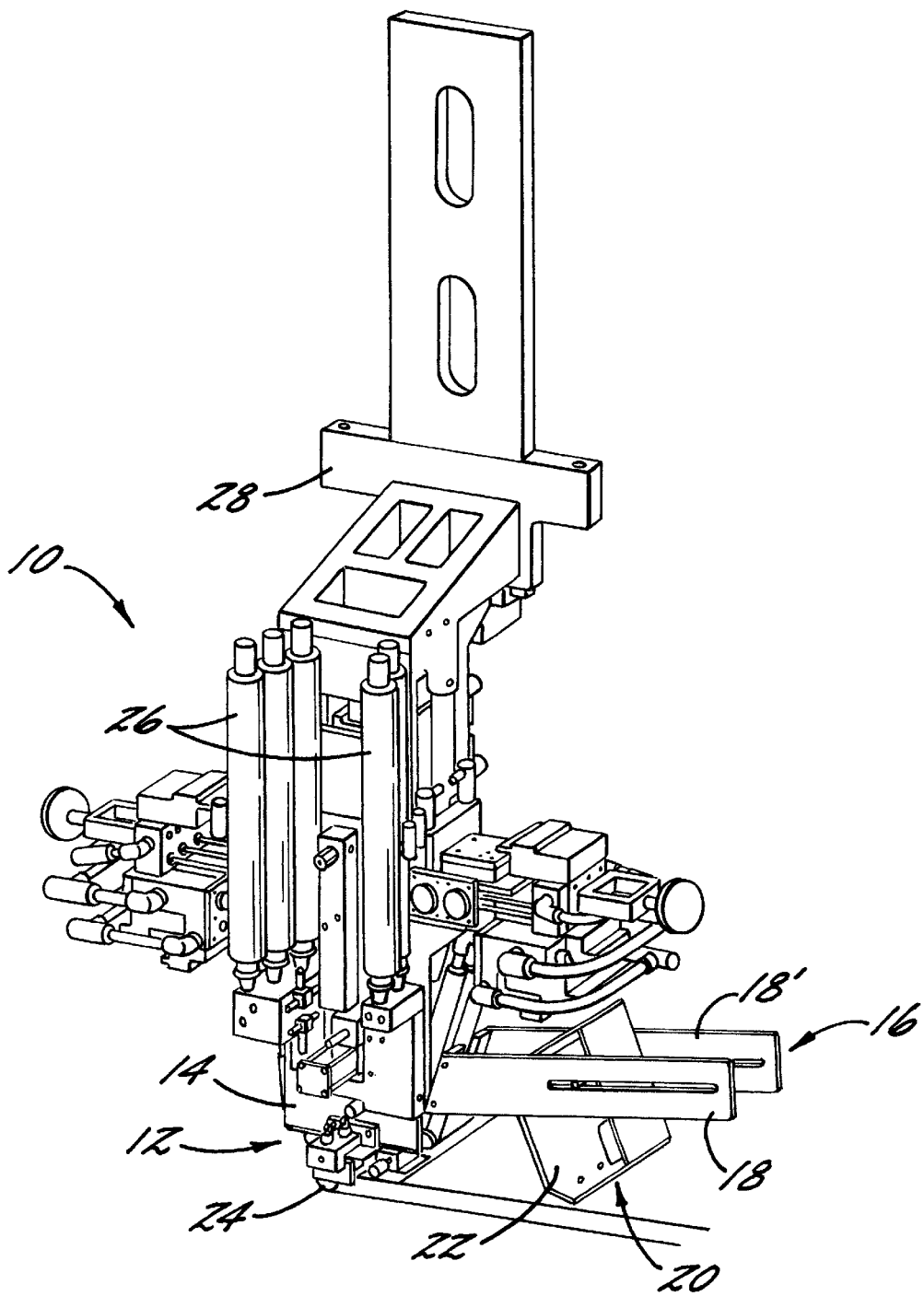
FIG. 1 is a perspective view of an apparatus in accordance with a preferred embodiment of the invention, showing a placement head for placing a tape onto a substrate and a laser diode array supported on the placement head.

With reference to FIG. 1, an apparatus for placing tape material onto a substrate in accordance with a preferred embodiment of the invention is depicted and is broadly denoted by reference numeral 10. The apparatus 10 includes a placement head 12 of the type used in automated placement of fiber/resin tape onto a substrate through computer-controlled manipulation of the placement head and movement of either the placement head or the substrate such that tape material is continuously fed and guided onto the substrate as the head relatively moves over the substrate surface. For purposes of explanation of the present invention, the relevant features of the apparatus 10 include a frame 14 of the placement head, an adjustment slide 16 supported by the frame and comprising a pair of spaced support plates 18 and 18', a laser diode array 20 having a housing 22 supported between the support plates 18 and 18' of the adjustment slide 16, and a compaction roller 24 rotatably journalled in the frame 14. The apparatus also includes actuators 26 for urging the placement head 12 downward with respect to the main support frame 28 of the apparatus so as to urge the compaction roller 24 against the substrate onto which the tape material is being applied.

Figure 2:
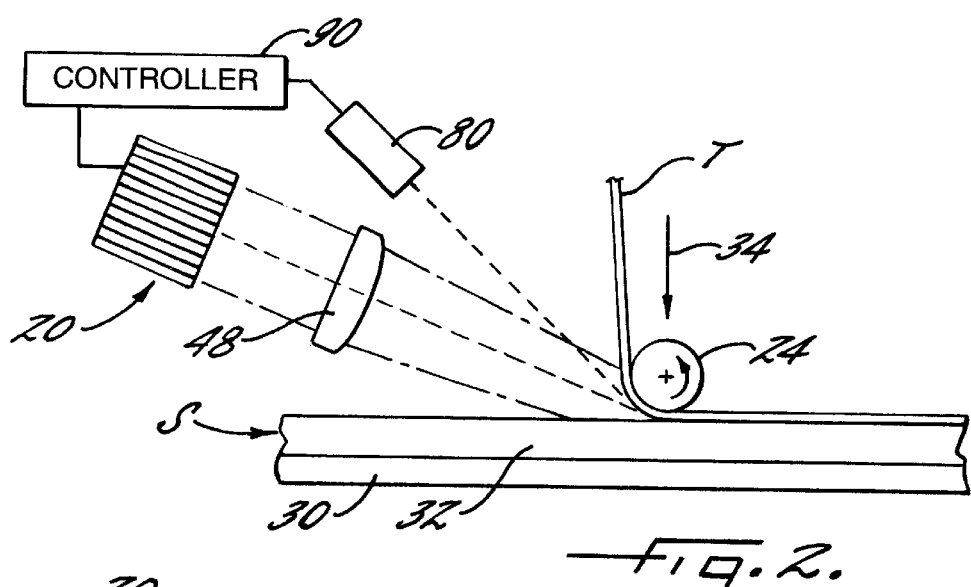
FIG. 2 is a schematic side view of a tape being placed onto a substrate in accordance with a method of the invention.

The operation of placing tape material in accordance with the invention is depicted in FIG. 2. Composite tape material T is guided over the compaction roller 24 and onto the substrate S. The substrate S is depicted as comprising a template 30 and a composite 32 covering the template and formed of one or more previously laid layers of composite tape. The compaction roller 24 is urged downwardly, as indicated by arrow 34, so as to press the tape material T onto the substrate S. The compaction roller 24 rolls along the surface of the substrate as relative movement is provided between the roller and the substrate, and the tape material T is continuously fed and pressed onto the substrate by the roller. Adhesion of the tape T to the substrate is promoted by heating the tape T, or the substrate S, or preferably both, just prior to the tape being laid onto the substrate. Typically, a plurality of tapes of differing widths may be simultaneously guided and pressed onto the substrate during the fabrication of a composite article. In many cases, the tape material T may comprise a plurality of individual tapes that are guided through the compaction region between the compaction roller 24 and the substrate S in side-by-side collimated orientation. For example, a six-inch wide tape material may consist of six one-inch wide tapes located side-by-side. In many production processes for fabricating large composite structures, as many as 24 to 32 individual tapes may be collimated and passed through the compaction region where they are collated under elevated temperature and pressure at the compaction region. The individual tapes can range from ⅛-inch wide to six inches wide or more.

The process as described thus far is generally known to persons of ordinary skill in the art, and accordingly will not be described in further detail. In conventional tape-placing methods, however, hot gas impingement is used for heating the tape and substrate. It will be appreciated that it is difficult or impossible to precisely control where the hot gas impinges on the tape and substrate, and after impingement the hot gas can go in undesired directions. As a consequence, the accuracy with which the tape and substrate temperatures can be controlled with hot gas impingement is not very good.

In accordance with the present invention, the tape material and/or substrate are heated by irradiating them with light energy, preferably from a laser diode array. The laser beams can be precisely controlled in terms of where they impinge on the tape material and substrate. Additionally, the invention enables further advantages by allowing a profile of the light energy field that is directed onto the target materials to be tailored so as to achieve differential heating between different regions of the target materials.

Figure 3:
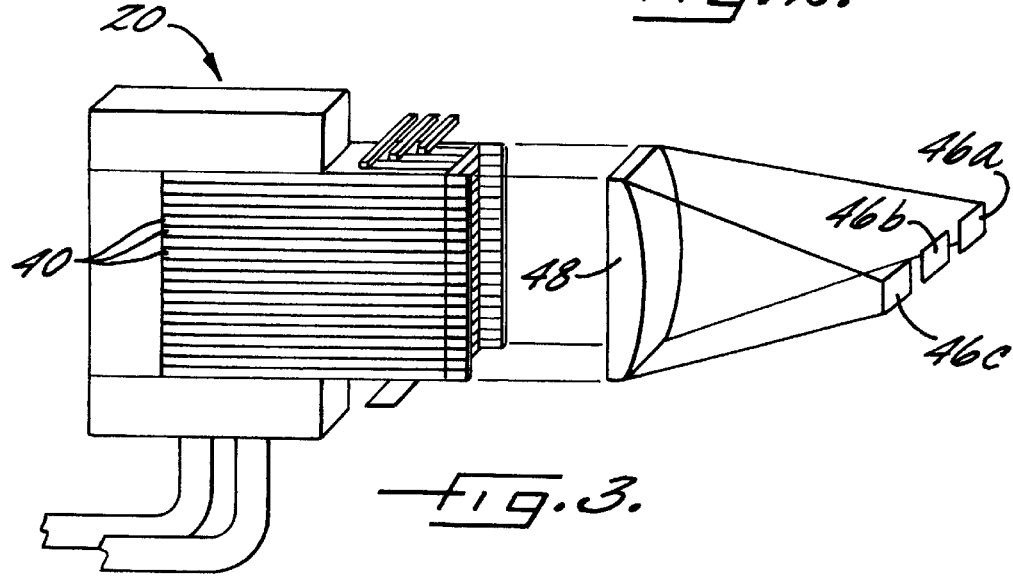
FIG. 3 is a perspective view of a laser diode array and cylindrical lens for focusing the light field generated by the array into a narrow configuration in accordance with a further preferred embodiment of the invention.
Figure 3A:
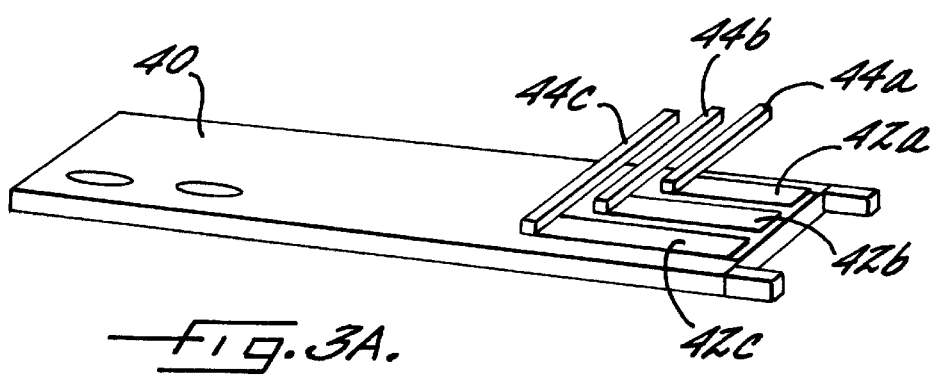
FIG. 3A is a perspective view of a single laser diode bar.

To these ends, light energy is directed onto the tape material and/or substrate, in preferred embodiments of the invention, by a laser diode array 20. The array 20 comprises a plurality of independently controllable laser diodes (not shown in FIG. 2) arranged in a two-dimensional array such that the laser beams from the diodes collectively form a field of light energy capable of irradiating a relatively large area of a surface compared with the area that can be irradiated by a single diode. The laser diode array 20 is depicted in greater detail in FIG. 3. The array 20 comprises a plurality of laser diode bars 40 stacked one upon another and all oriented in the same direction; a single laser diode bar 40 is shown in FIG. 3A. Laser diode bars of either the constant-wave or the pulsed type can be used. The array 20 is a three-zone array, formed by providing each of the bars 40 with three independently addressable diode groups 42a, 42b, and 42c. Each of the diode groups 42a,b,c is formed by one or more individual laser diodes arranged side-by-side along the widthwise direction of the bar 40. The groups are electrically coupled with a power source (not shown) independently of the other groups by separate conductors 44a,b,c. It will be understood that three groups are shown for illustrative purposes only, and that any desired number of groups can be provided for each bar, limited only by the number of individual diodes on the bar. When the bars 40 are stacked to form the array 20, the groups 42a,b,c of the bars in the illustrated embodiment form three columns located side-by-side along the widthwise directions of the bars. As depicted in FIG. 3, the field of light energy produced by the array 20 thus is made up of three zones 46a, 46b, and 46c corresponding to the three diode groups of each bar. The light field from the array 20 can be guided and focused by an imaging system 48 onto the tape material and substrate. The imaging system can include lenses, fiber optic elements, and/or mirrors or the like. Power can be supplied to the diode array by various types of conductors connected to the diode bars. A preferred arrangement uses flex circuits for establishing the electrical connection between the diode bars and the power source. A flex circuit in its simplest form comprises a layer of conductive foil (typically copper) laminated on one or both sides to a flexible layer of a dielectric material. Flex circuits are rugged enough to withstand the vibration and motion that can occur as the placement head is operated.

By suitably controlling the power supplied to each diode group independently of the other diode groups on each bar 40, the array 20 can be made to produce any desired profile of light intensity in the widthwise direction of each bar. Furthermore, by suitably controlling the power supplied to each bar independently of the other bars, the array can produce any desired profile of light intensity in the height direction of the stack of bars. In FIG. 2, the array 20 is oriented such that the widthwise direction of each bar 40 is parallel with the widthwise direction of the tape material T, and the height direction of the stack is parallel with the lengthwise direction of the tape material. Thus, there are three independently controllable zones of light intensity across the width of the tape material. In the lengthwise direction of the tape material, however, there is no division of the light field into separate zones; all of the diode groups 44a for all bars 40 would be powered in the same manner, and likewise for each of the other diode groups. FIG. 3 also demonstrates that the imaging system 48 can, if desired, be operable to focus the light field from the array 20 into a generally one-dimensional field (i.e., having a dimension along one direction that is much less than the dimensional along the orthogonal direction).

Figure 4:
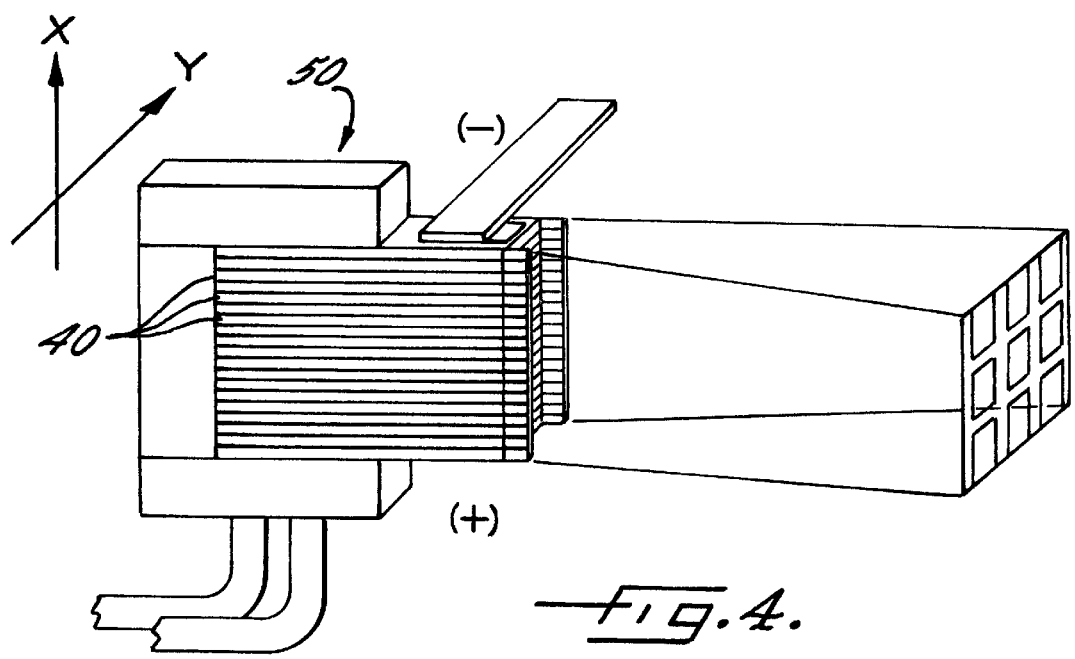
FIG. 4 is a view similar to FIG. 3, but showing a laser diode array generating a wider light field.

More preferably, however, the diode array and imaging system produce a two-dimensional light field as shown in FIG. 4. The diode array 50 shown in FIG. 4 is divided into three diode groups along the widthwise direction of each bar (denoted as the Y-direction of the array), similar to the array 20 previously described. However, the array 50 is also divided into three groups along the orthogonal X-direction of the array, such that the light field from the array consists of a 3-by-3 matrix of independently controllable light zones. The division of the array 50 into groups along the X-direction is accomplished by controlling each bar 40, or each group of adjacent bars 40, independently of the other bars or groups of bars. It will be understood that the 3-by-3 matrix is only an example, and in practice it may be advantageous to provide a substantially greater number of zones in the X-direction and/or in the Y-direction.

Figure 5:
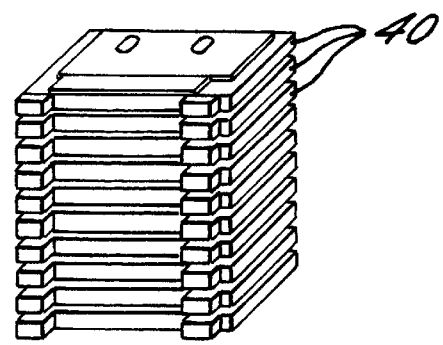
FIG. 5 is a perspective view of a laser diode array formed of one stack of laser diode bars.
Figure 6:
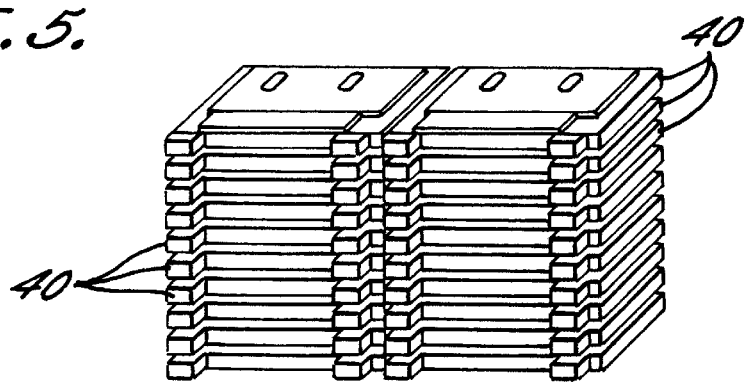
FIG. 6 is a perspective view of a laser diode array formed of two side-by-side stacks of laser diode bars.

A laser diode array can be formed of a single stack of laser diode bars 40, as shown in FIG. 5. It is also possible, of course, to form a laser diode array from more than one stack of diode bars located side-by-side, as shown in FIG. 6. A typical type of commercially available laser diode bar has a width of about 1 cm and a height of about 1 mm. Thus, where very wide tape material is being placed, it may be necessary to employ a substantial number of stacks of the bars located side-by-side. It will also be recognized that the widthwise directions of the bars 40 can be oriented either parallel with the widthwise direction of the tape material or parallel with the lengthwise direction of the tape material.

Figure 7:
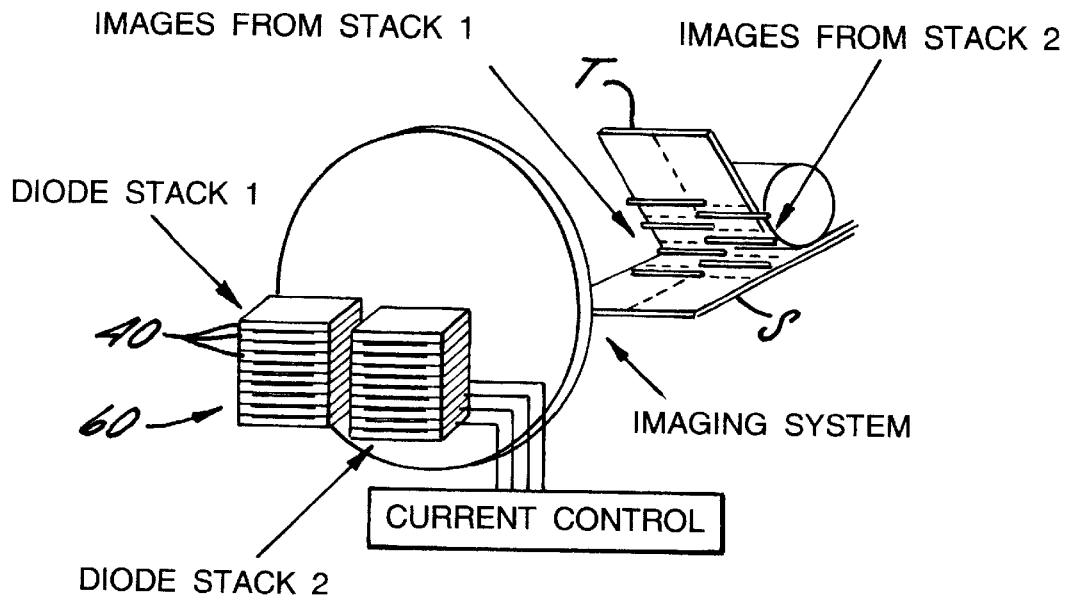
FIG. 7 is a perspective view schematically depicting an apparatus for laying composite tape onto a substrate in accordance with another embodiment of the invention.
Figure 8:
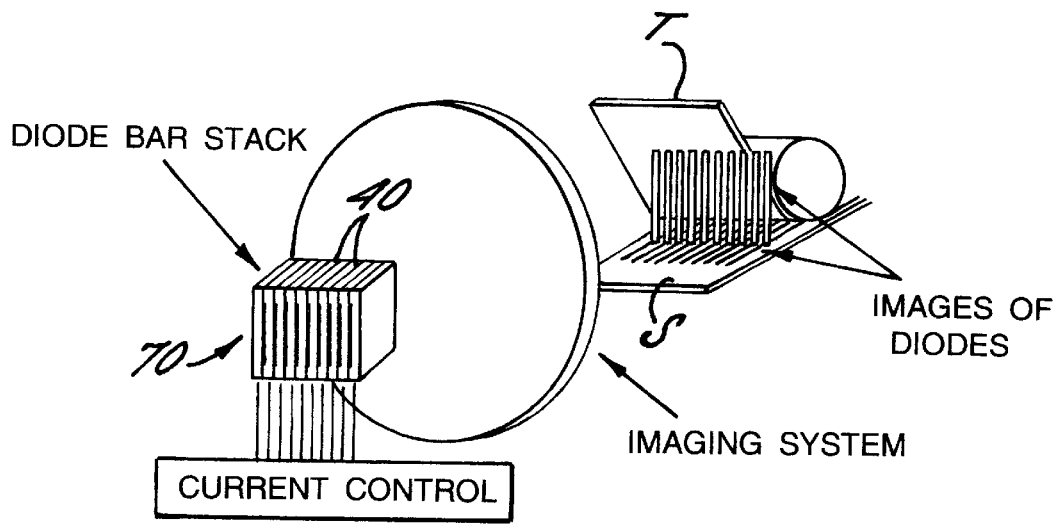
FIG. 8 is a view similar to FIG. 7, showing yet another embodiment of the invention.

Thus, FIG. 7 depicts an apparatus in accordance with the invention, in which a laser diode array 60 is formed by two side-by-side stacks of diode bars 40 having their widthwise directions oriented parallel with the widthwise direction of the tape material T. FIG. 8 depicts an apparatus in which a laser diode array 70 is formed by one stack of diode bars 40 having their widthwise directions oriented parallel with the lengthwise direction of the tape material. The images of the laser beams from the diode bars 40 are schematically depicted on the tape material T and the substrate S in each case.

The area of the tape and substrate irradiated by the laser diode array can have various sizes and shapes for achieving adequate heating of the materials to be joined. In general, the tape and substrate at the compaction region (i.e., the region where the tape is compacted onto the substrate) should be maintained at a temperature at which the resins in the tape and at the surface of the substrate become sufficiently plastic that they flow together to form a good bond. The laser light provides the energy to raise the temperature of both the tape and the substrate. The amount of heat that must be delivered by the laser light field to the tape and substrate surfaces is a complex function of the rate at which the tape is being placed, the tape material properties, and other factors. In practice, the light field can be set to a reasonable length along the lengthwise direction of the tape material and substrate, and the temperature of the materials can be controlled by varying the laser energy. However, the length of the light field can easily be varied in accordance with the present invention, by deactivating one or more of the laser diode groups in the array.

The width of the light field can also be easily adjusted. This can be beneficial because in many production processes the tape material T is formed by a plurality of individual tapes that are guided through the compaction region between the compaction roller and the substrate in side-by-side collimated relation. In some cases the total width of the combined tapes may be greater than in other cases. The present invention enables the width of the laser light field to be tailored to the width of the tape material being guided and pressed in the compaction region. For example, FIG. 7 depicts a simple case in which the tape material T consists of two side-by-side tapes. One of the tapes is irradiated by light coming from one of the stacks of diode bars 40, and the other tape is irradiated by light coming from the other stack. If one of the tapes is dropped such that only the other tape is guided through the compaction region, the stack of diode bars corresponding to the dropped tape can be deactivated. The same effect can be achieved where the laser diode array consists of a single stack of bars, by dividing the bars into a plurality of diode groups across the widthwise direction of the tape material, and deactivating those groups that are not needed.

Alternatively, as shown in FIG. 8, where the stack of bars is oriented such that the widthwise directions of the bars are parallel with the lengthwise direction of the tape material, the width of the light field is tailored by deactivating one or more of the bars. For example, the tape material might consist of 20 side-by-side tapes, and the laser diode array might comprise 20 laser diode bars, each bar irradiating one of the tapes. If, for instance, six of the tapes are dropped such that only 14 tapes are guided through the compaction region, then the corresponding six diode bars can be deactivated. Of course, a given tape can be irradiated by more than one diode bar.

A further advantage of the invention is that a non-uniform heating profile can be applied to the tape material and/or the substrate for achieving various effects. As an example, a different amount of heating can be applied to the tape material relative to that applied to the substrate, by suitably dividing the laser diode array into diode groups that are spaced apart along the lengthwise direction of the tape material, and independently controlling the diode groups such that the groups that irradiate the tape material receive more or less power than those that irradiate the substrate. Such differential heating can be used to compensate for differential rates of heat loss from the tape and substrate. For instance, the tape, being quite thin, tends to lose heat more rapidly than the thicker substrate. Accordingly, the heating applied to the tape can be greater than that applied to the substrate. This effect cannot easily be accomplished using conventional forced-air heating.

The heating of the tape and substrate at the compaction region can be monitored by using a temperature sensor 80 (FIG. 2). The temperature sensor can comprise, for example, an infrared sensor, a fast pyrometer, or the like. The output from the sensor can be used by a controller 90 in a feedback control scheme for controlling the electrical current supplied to the laser diode array such that a desired temperature is maintained at the compaction region. Furthermore, more than one temperature sensor can be used for monitoring different regions of the tape and substrate corresponding to different diode groups of the array 20, such that each diode group can be controlled to maintain the corresponding region of the tape or substrate at a desired temperature. As an alternative to feedback control through temperature monitoring, the controller 90 could instead be programmed to control the current supplied to the various diode groups of the laser diode array as a function of relative movement between the placement head and the substrate. For instance, the current could be varied as a function of the relative speed of the placement head, and/or as a function of the shape of the path along which the tape is guided onto the substrate.

The invention also enables improved lay-up of complex-shaped composite articles in which the tapes must be steered along curved paths in order to maintain the desired fiber orientations across the surface of the article. When a tape is steered along a curved path at the compaction region, the material of the tape on the inner radius of the path must conform to a greater degree than the material on the outer radius of the path. Accordingly, the material on the inner radius could benefit from increased heating so that it can more readily flow and conform to the surface without substantial puckering or wrinkling; conversely, the material on the outer radius does not have to conform as much and hence could benefit from a more gradual thermal profile to optimize quality and eliminate defects. However, with conventional forced-air heating, only uniform heating across the tape width can be achieved. This uniform heating often produces numerous defects in the lay-up. As a consequence, the speed of the placement head is typically reduced around curved paths in an effort to minimize the defects.

With the methods of the present invention, however, non-uniform heating across the tape width can readily be achieved, such that the heating profile can be optimized to the requirements of the process. Such non-uniform heating is particularly beneficial in the case of fiber-resin composite tapes because such composite material can have very different thermal diffusivities in different directions of the material. For example, in the case of a unidirectional composite tape in which the fibers are all oriented in a single direction, the thermal diffusivity along the direction of the fibers is much higher than along a direction transverse to the fibers. The thermal diffusivity, α, is given by $$\alpha = k/(\rho c_p),$$

where k=thermal conductivity in the direction of interest, ρ=density of the material, and $c_p$=specific heat of the material.

Thus, in the fiber direction, the thermal conductivity is dominated by the fibers, which can have very high conductivity, particularly in the case of good conducting fibers such as carbon. On the other hand, in the direction transverse to the fiber direction, the thermal conductivity is dominated by the resin, which typically has a relatively low conductivity. Accordingly, the thermal diffusivity in the fiber direction can be much higher, in some cases an order of magnitude higher, than the thermal diffusivity across the fibers. This means that heat applied to one portion of a composite tape may not be readily conducted to adjacent portions of the tape if the adjacent portions are in the cross-fiber direction. Thus, whereas a strip of an isotropic material such as metal may quickly assume a generally uniform temperature distribution across its width regardless of the profile of the heat being added, the same may not be true for a composite tape. This characteristic can be used to advantage in the present invention, by applying heat non-uniformly across the width of the tape so as to heat different widthwise portions of the tape to different extents.

The zonal heating capability provided by the present invention can be particularly advantageous when laying tape onto composite articles of complex shapes requiring the tape to be steered along curved paths and/or over surfaces of concave and convex curvature. When steering a tape along a curved path on a flat surface, the portion of the tape at the inner radius of the path must conform to a greater extent than the portion at the outer radius of the path if it is to lie flat on the surface without puckering, wrinkling, or bunching. With forced-air heating, the heating of the tape is constant across its width, and hence there is no opportunity to vary the heating in an effort to improve conformation of the tape to the surface in difficult regions such as the inner radius of a curved path. Such difficult regions are dealt with instead by reducing the speed of travel of the tape placement head, which gives the tape more time to deform and conform to the surface. The present invention enables a heating gradient to be produced widthwise across the tape so that such variable heating can be used to advantage to improve conformation of the tape without having to greatly reduce the speed of the tape placement head, thereby maximizing throughput.

Figure 9:
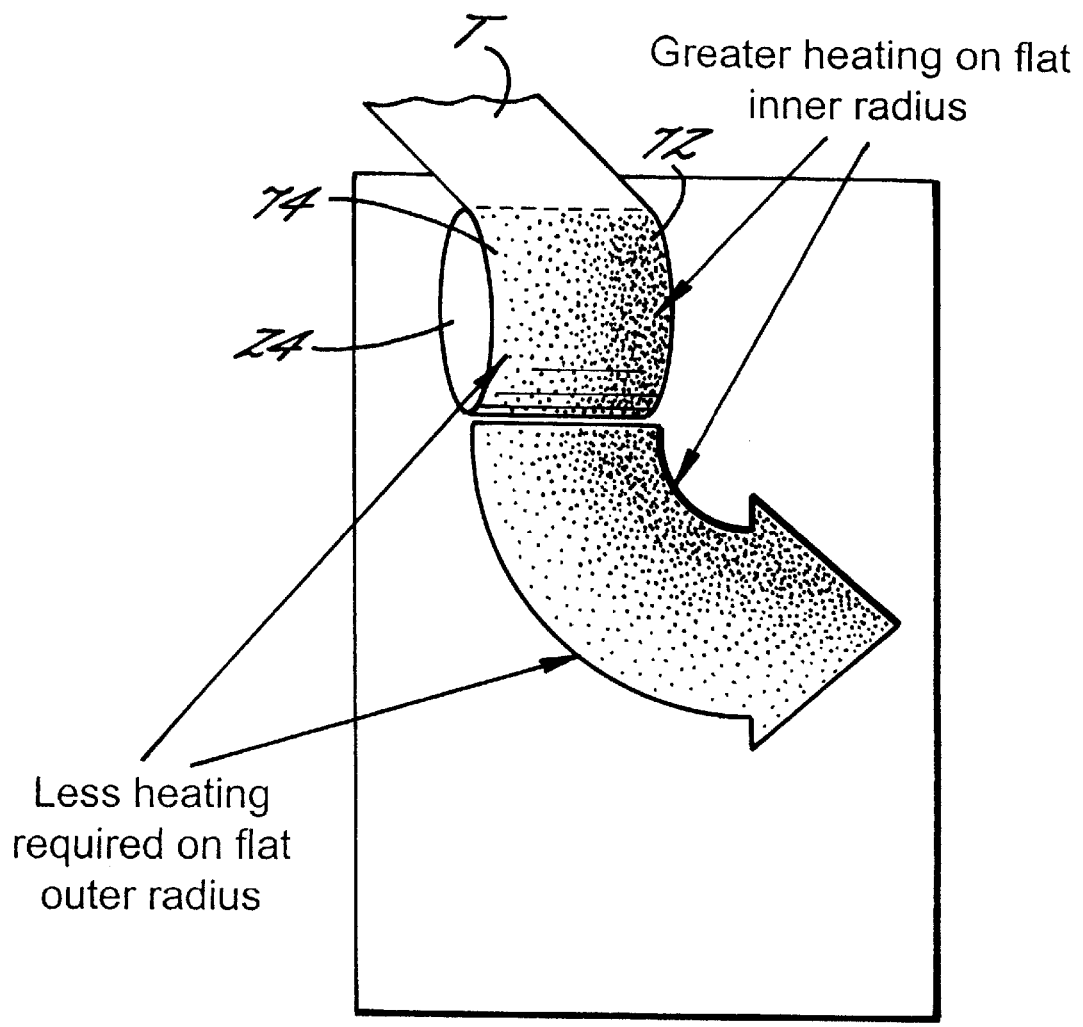
FIG. 9 is a diagrammatic illustration of a tape being steered along a curved path on a flat substrate, depicting a non-uniform heating profile for heating the tape at the inner radius of the path to a greater extent than the tape at the outer radius of the path.

As one illustrative example of the types of non-uniform heating patterns that can be used to advantage as a result of the present invention, FIG. 9 shows a diagrammatic view of a tape T being steered along a curved path on a flat surface. The inner edge portion 72 of the tape at the inner radius of the steered path is heated to a relatively greater extent that the outer edge portion 74 of the tape at the outer radius of the path. Accordingly, the tack of the inner edge portion 72 will be improved and wrinkling will be reduced relative to a uniformly heated tape.

When laying a tape onto a surface having concave or convex curvature, a different set of problems are created. First, the speed of the tape placement head over the surface tends to vary. For instance, when the head enters a concave region the placement head speed may typically decrease, and may increase when passing over a convex region. If the heating rate of the tape is optimized for a given head speed on the flat and is held constant at this rate, the tape in the concave regions can be overheated and the tape in the convex regions can be underheated.

Figure 10:
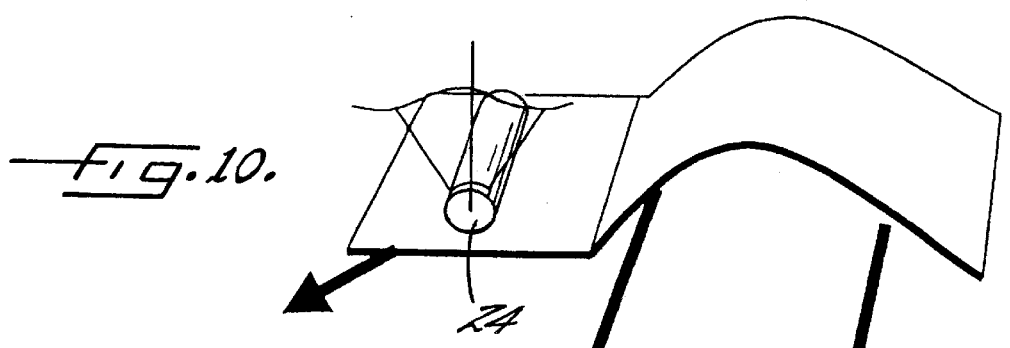
FIG. 10 is a diagrammatic illustration of a tape being guided onto a contoured substrate.
Figure 11:
FIG. 11 is a diagrammatic illustration of a tape being guided onto a flat substrate, showing the incidence angle of the laser radiation onto the substrate.
Figure 12:
FIG. 12 is a view similar to FIG. 11 but on a non-flat substrate causing the incidence angle of radiation on the substrate to become more acute.
Figure 13:
FIG. 13 is a view similar to FIG. 12, showing the tape being guided onto a non-flat substrate so as to cause the incidence angle of radiation on the substrate to become more obtuse.

Second, the angle of the tape placement head relative to the surface tends to vary when the head passes over convex or concave regions of the substrate surface. This results in varying degrees of reflectance and absorption of the laser radiation being directed onto the substrate near the compaction region. This is diagrammatically illustrated in FIGS. 10 through 13. FIG. 10 shows the compaction roller 24 of the tape placement head rolling over a flat region and about to enter a concave region followed by a convex region. FIGS. 11, 12, and 13 show side views of the apparatus on the flat, on the concave region, and on the convex region, respectively. When the substrate surface is flat as in FIG. 11, an axis of the tape placement head is generally normal to the surface and the laser radiation impinges on the tape and substrate surfaces at a certain incidence angle. Some of the laser radiation striking the substrate will be absorbed by the substrate and some will be reflected onto the tape near the compaction region. If the tape placement head then passes over a non-flat region as in FIG. 12, the axis of the tape placement head is no longer normal to the surface. In the situation depicted, the axis makes an acute angle with the substrate such that the laser radiation strikes the substrate at a more-acute angle. Accordingly, the degree of reflectance of the radiation from the substrate will increase and the degree of absorption by the substrate will decrease. If the intensity of the laser radiation is unchanged from that in FIG. 11, then the heating of the tape near the compaction region will increase and the heating of the substrate will decrease. FIG. 13 shows the opposite situation where the axis of the head makes an obtuse angle with the substrate, which causes the reflectance from the substrate to decrease, thus causing the heating of the substrate to increase and the heating of the tape to be reduced.

The present invention, however, enables the heating profile of the radiation to be varied along the direction of travel of the tape placement head to compensate for these effects so that the intensity of the radiation directed onto the substrate and tape at the compaction region are varied in response to changes in angle of the tape placement head relative to the substrate surface to maintain a more-nearly optimum heating of the tape and substrate at all times. Thus, in the configuration shown in FIG. 12, changes in reflectance require decreased illumination of the tape and increased illumination of the substrate near the compaction region. Conversely, in the configuration shown in FIG. 13, changes in reflectance require increased illumination of the tape and reduced illumination of the substrate near the compaction region.

When steering a tape along a curved path on a surface that is convex or concave, the types of undesirable effects induced by curved paths and by non-flat surfaces described above are superimposed. Accordingly, the non-uniform heating profiles for each can be superimposed to compensate for these effects.

As noted above, one way in which different heating rates can be applied to different areas of the tape and/or substrate is to divide the laser diode array into a plurality of independently addressable zones and supply differing currents to the various zones. Another way in which different rates of heating can be applied to different areas of the tape and/or substrate is to configure the laser diode array such that some diode groups produce laser light of a different wavelength from other diode groups. The rate at which composite material absorbs light energy is dependent on, among other factors, the wavelength of the incident light. Thus, as one example, a laser diode array can be formed by stacking a plurality of laser diode bars as described above, wherein some of the diode bars produce light of a different wavelength from other bars. Bars producing light of one wavelength can be used for irradiating the tape material, and bars of another wavelength can be used for irradiating the substrate. Alternatively, bars producing light of one wavelength can be used for irradiating one widthwise portion of the tape material and/or substrate, and bars of another wavelength can be used for irradiating another widthwise portion of the tape material and/or substrate. If desired, the array can also be divided into independently powered diode groups as previously described.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of forming a composite article from composite tape, the method comprising:

guiding the composite tape onto a surface of a substrate and pressing the tape against the substrate in a compaction region such that the tape conforms to the contour of the surface of the substrate and is adhered thereto; and irradiating an area defined by opposing surfaces of the tape and of the substrate proximate the compaction region with a field of light energy generated by a laser diode array to heat the tape and substrate, wherein the laser diode array is controlled so as to irradiate at least one of the opposing surfaces with light energy having a light intensity distribution that is non-uniform in at least one direction.

2. The method of claim 1, wherein the laser diode array is controlled so as to irradiate at least one of the opposing surfaces with light energy having a light intensity distribution that is a function of a curvature of a path along which the tape is guided onto the substrate at the compaction region.

3. The method of claim 1, wherein the tape is guided along a curved path at the compaction region such that an inner widthwise portion of the tape at an inner radius of the path must undergo a greater degree of conformance relative to an outer widthwise portion of the tape at an outer radius of the path, and wherein the laser diode array is controlled such that the inner widthwise portion of the tape receives a greater light intensity relative to the outer widthwise portion of the tape.

4. A method of forming a composite article from composite tape, the method comprising:

guiding the composite tape onto a surface of a substrate and pressing the tape against the substrate in a compaction region such that the tape conforms to the contour of the surface of the substrate and is adhered thereto; and irradiating an area defined by opposing surfaces of the tape and of the substrate proximate the compaction region with a field of light energy generated by a laser diode array to heat the tape and substrate, wherein the laser diode array is controlled such that a greater amount of heat energy is applied to the opposing surface of the tape relative to the amount of heat energy applied to the opposing surface of the substrate.

5. A method of forming a composite article from composite tape, the method comprising:

guiding the composite tape onto a surface of a substrate and pressing the tape against the substrate in a compaction region such that the tape conforms to the contour of the surface of the substrate and is adhered thereto; and irradiating an area defined by opposing surfaces of the tape and of the substrate proximate the compaction region with a field of light energy generated by a laser diode array to heat the tape and substrate, wherein at least two tapes are simultaneously fed to the compaction region and placed onto the substrate at different feed rates, and wherein the laser diode array is controlled so as to produce a different amount of heating of one tape relative to the other to compensate for the different feed rates.

6. A method of forming a composite article from composite tape, the method comprising:

guiding the composite tape onto a surface of a substrate and pressing the tape against the substrate in a compaction region such that the tape conforms to the contour of the surface of the substrate and is adhered thereto; and irradiating an area defined by opposing surfaces of the tape and of the substrate proximate the compaction region with a field of light energy generated by a laser diode array to heat the tape and substrate, wherein the tape is guided and pressed onto the substrate by a tape placement head and the laser diode array is fixed relative to the tape placement head such that when the tape is guided and pressed onto a contoured surface of the substrate having a convex or concave curvature there is a change in orientation of the tape placement head relative to the substrate surface causing the angle of incidence of the light energy striking the substrate to change, and wherein the laser diode array is controlled so as to compensate for the change in incidence angle by varying a profile of the intensity of the light energy in the direction in which the tape placement head travels over the surface.

7. A method for making a composite article from composite tape material, comprising:

guiding composite tape material onto a surface of a substrate and pressing the composite tape material in a compaction region such that the tape material conforms to the contour of the surface of the substrate and is adhered thereto; and irradiating an area of the tape material and the substrate proximate the compaction region with a field of light energy generated by a laser diode array, the array being divided into at least first and second diode groups which produce at least first and second light zones respectively irradiating first and second regions of the area, and wherein the first diode group is operable to irradiate the first region with light of a first wavelength and the second diode group is operable to irradiate the second region with light of a second wavelength different from the first wavelength, the first region absorbing the light of the first wavelength to a different extent than the second region absorbs the light of the second wavelength.

8. A method for making a composite article from composite tape material, comprising:

guiding composite tape material onto a surface of a substrate and pressing the composite tape material in a compaction region such that the tape material conforms to the contour of the surface of the substrate and is adhered thereto, the tape material having differing widths ranging from a widest tape material to a narrowest tape material;

irradiating the tape material proximate the compaction region with a field of light energy generated by a laser diode array, the array being divided into a plurality of independently operable diode groups producing a like number of light zones located side-by-side along a widthwise direction of the tape material, the array being operable such that the field of light energy irradiates the entire width of the widest tape material when all of the diode groups of the array are activated; and activating fewer than all of the diode groups of the array when tape material narrower than the widest tape material is being guided and pressed, such that the width of the field of light energy approximately matches that of the tape material.

9. The method of claim 8, wherein guiding the tape material comprises guiding a plurality of individual tapes such that the tapes are side-by-side and collimated as they pass through the compaction region, and wherein the laser diode array is divided such that there is at least one zone extending across the width of each tape.

10. The method of claim 8, wherein the laser diode array is formed by stacking a plurality of laser diode bars atop one another, each bar having a plurality of laser diode groups located side-by-side along a widthwise direction of the bar, the bars being oriented with their widthwise directions generally parallel with the width of the tape material being guided and pressed, and wherein one or more of the laser diode groups of each bar are inactivated when the tape material is narrower than the widest tape material.

11. The method of claim 8, wherein the laser diode array is formed by stacking a plurality of laser diode bars atop one another, each bar having a widthwise direction oriented generally parallel with a lengthwise direction of the tape material being guided and pressed, and wherein one or more of the laser diode bars are inactivated when the tape material is narrower than the widest tape material.

12. A method for making a composite article from composite tape material, comprising:

guiding composite tape material onto a surface of a substrate and pressing the composite tape material in a compaction region such that the tape material conforms to the contour of the surface of the substrate and is adhered thereto;

irradiating an area of the tape material proximate the compaction region with a field of light energy generated by a laser diode array, the array being divided in at least one direction into a plurality of independently activatable diode groups which, when activated, produce a like number of light zones located side-by-side along said direction; and varying the area of the tape material that is irradiated by the field of light energy by varying the number of the diode groups that are activated.

13. The method of claim 12, wherein the array is oriented such that the light zones are spaced along a widthwise direction of the tape material, and wherein a width of the area irradiated by the field of light energy is varied by deactivating a variable number of the diode groups.

14. The method of claim 12, wherein the array is oriented such that the light zones are spaced along a lengthwise direction of the tape material, and wherein a length of the area irradiated by the field of light energy is varied by deactivating a variable number of the diode groups.

15. The method of claim 12, wherein the array is divided into independently activatable diode groups along each of two orthogonal directions that are oriented parallel to a widthwise and a lengthwise direction of the tape material, and wherein both a width and a length of the area irradiated by the field of light energy are varied by deactivating a variable number of the diode groups in both of the orthogonal directions.

* * * * *